Patented Mar. 3, 1936

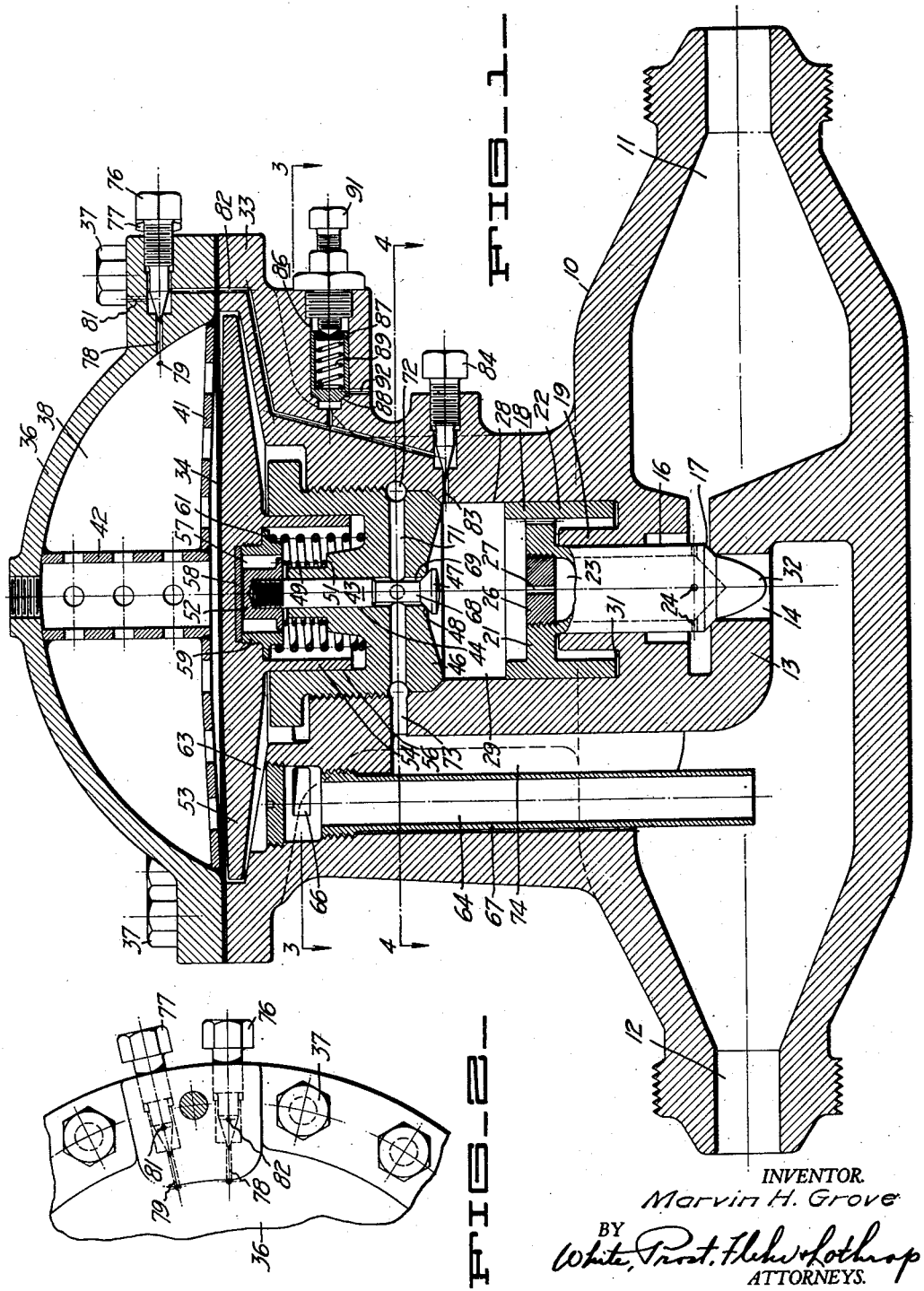

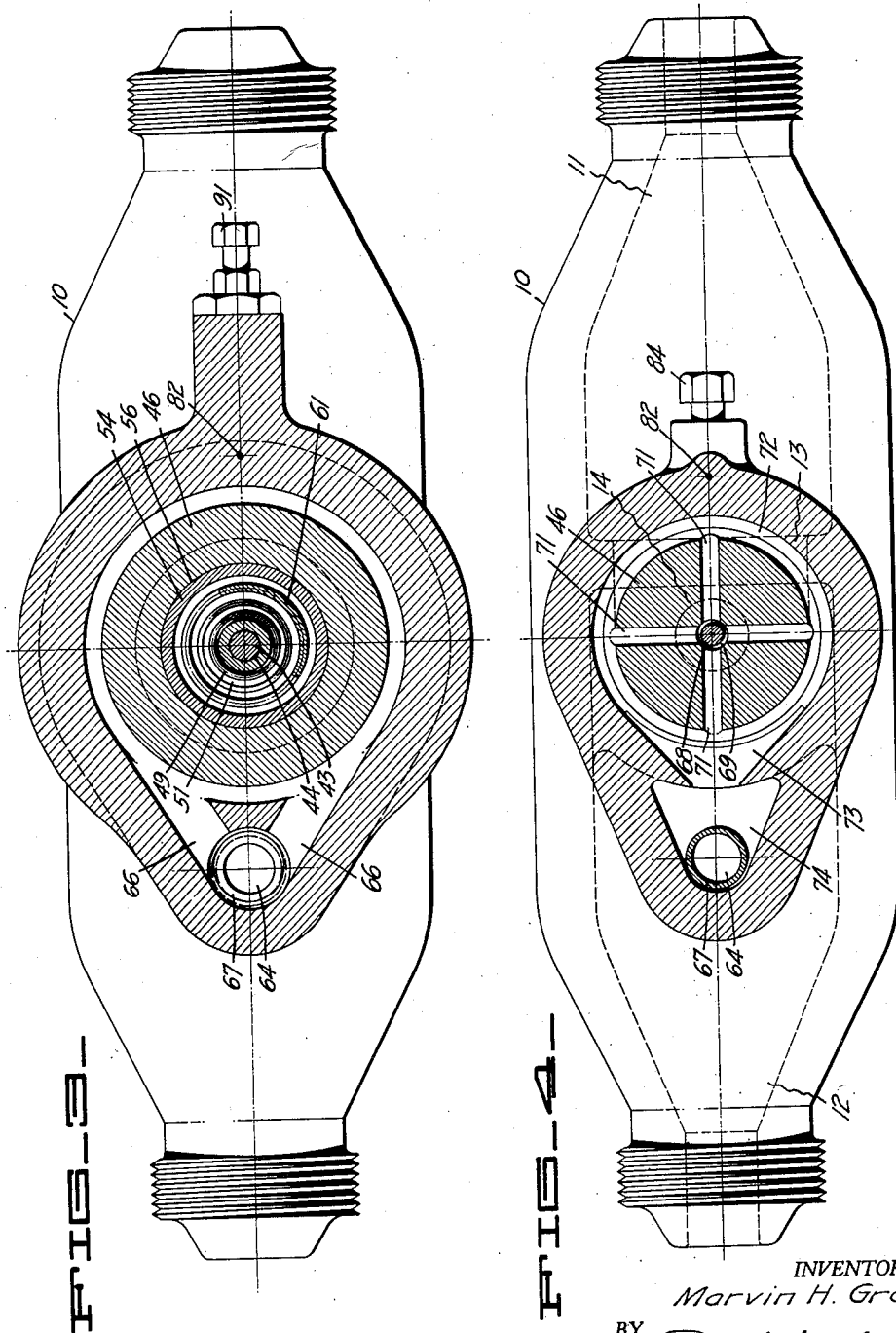

2,032,613

UNITED STATES PATENT OFFICE 2,032,613

GAS REDUCING VALVE AND METHOD

Marvin H. Grove, Vallejo, Calif.

Application April 11, 1932, Serial No. 604,560

5 Claims. (Cl. 50—11)

This invention relates generally to gas reducing valves or regulators, such as are employed for controlling flow of gas from a source under pressure, to a point of supply where substantially lower pressure is desired.

Gas reducing valves in the past have commonly utilized a movable valve member for throttling gas flow, in conjunction with means such as a diaphragm for positioning the valve member in accordance with the pressure of the gas on the outflow side. It has also been common to employ in addition to the main or throttling valve, a control or pilot valve actuated in accordance with gas pressure upon the outflow side, and in turn serving to control positioning of the throttling valve member. In such prior reducing valves the throttling valve member and its associated diaphragm or other actuating means is so designed as to secure a balancing of the valve member in certain intermediate positions for given pressure differentials between the inflow and the outflow sides, and for a given gas demand. Likewise friction or damping means is commonly employed to prevent rapid closing or opening movements of the valve member.

The disadvantages of prior reducing valves of the above type, can be briefly outlined as follows:—They are relatively sluggish in responding to different demands at the point of gas supply, thus making accurate regulation impossible. Sluggishness is particularly manifest when the demand suddenly ceases, since slow responsive closing of the throttling valve permits a higher gas pressure than that desired to build up in the outflow pipe. For high pressure application, where the inflow pressure may be several thousand pounds compared to a relatively low pressure required upon the outflow side, such undesirable characteristics of prior reducing valves become more pronounced, and it is likewise difficult to keep the throttling valve tight during periods when there is no gas demand.

It is an object of the present invention to devise a gas reducing valve, and method utilized in conjunction with the same, which will make possible a relatively high degree of accuracy in effecting regulation.

It is a further object of the invention to devise a gas reducing valve which can be successfully employed in conjunction with high pressure lines, which will give relatively accurate regulation irrespective of wide fluctuations in the pressure upon the inflow side, and which will remain tight during periods when there is no gas demand.

A further object of the invention is to devise an improved gas reducing valve characterized by simplicity of construction, reliability in operation, and ease of commercial manufacture.

Further objects and characteristics of the invention will appear from the following description in which the preferred embodiment of the invention has been set forth in detail in conjunction with the accompanying drawings. It is to be understood that the appended claims are to be accorded a range of equivalents consistent with the state of the prior art.

Referring to the drawings:

Fig. 1 is a side elevational view, in cross section, illustrating a gas reducing valve incorporating the present invention.

Fig. 2 is a fragmentary detail, illustrating adjustable valves utilized in securing a desired regulation.

Fig. 3 is a cross sectional detail taken along the lines 3—3 of Fig. 1.

Fig. 4 is a cross sectional detail taken along the line 4—4 of Fig. 1.

Structurally, the invention can be outlined briefly as preferably comprising a variable orifice means, formed by a stationary valve seat and a movable valve member, actuating means connected with the valve member, and control means including a pilot valve. As distinguished from the prior art these parts are so coordinated and adapted to secure a radically new mode of operation.

Referring to the drawings:—The form of reducing valve illustrated therein consists of a hollow body 10, formed to provide inflow and outflow openings or passages 11 and 12. Inflow passage 11 is adapted to be connected with a source of gas under pressure, while outflow opening 12 is adapted to be connected to pipes or conduits leading to a point of gas supply. Formed within body 10 there is a stationary valve seat 13, and passage 14 through this seat serves to communicate between the inflow and outflow openings. Cooperating with the stationary seat 13, there is a movable valve member 16, of the poppet type, provided with a conical valve surface 17 adapted to engage seat 13. A suitable detailed construction for valve member 16 will be presently described, but it may be explained at this point that its upper end is connected to a piston 18, forming a part of means for actuating the same.

The main body of valve member 16 extending above the valve surface 17, is cylindrical, and is slidably fitted within a portion 19 formed within the body. Piston 18 can conveniently be integral with the valve member 16, and is illustrated as being formed of an annular wall portion 21, merging with a peripheral portion 22 having an outer cylindrical surface. Valve member 16 is hollow to form an inner gas passage 23, the lower portion of which is in restricted communication with the inflow side of the reducing valve, through radial ducts 24. The upper end of passage 23 is closed by plug 26, provided with a flow restricting orifice 27. The body of the valve is bored to form a cylinder 28, in which piston 18 is fitted. The spaces or chambers above and below piston 18, formed by cylinder 28, have been designated 29 and 31 for future reference. Depending from the lower end of valve member 16, there is a parabolic shaped portion 32, for a purpose which will be presently explained.

The control means, which include the pilot valve, can be now described as follows:—The upper portion of body 10 is formed to afford an annular flange 33, which serves to engage the peripheral edge portion of a flexible diaphragm 34. Extending over diaphragm 34, there is a dome 36, adapted to be secured to annular flange portion 33, by suitable means such as cap screws 37. A suitable seal is formed between the peripheral edge portion of the diaphragm 34, and the shoulders of the body and dome 36 between which it is clamped, to prevent leakage at that point. Dome 36 forms a closed gas chamber 38 above diaphragm 34. To limit upward deflection of diaphragm 34, positioned within the dome 36 and immediately overlying the diaphragm, there is a perforated dished plate 41, having its central portion connected to the top of the dome by a perforated tube 42.

Disposed within the body 10 and below diaphragm 34, there is a control or pilot valve member 43. The shank of pilot valve member 43 is guided within a bore 44 for sliding or reciprocating movement, and bore 44 is in turn formed within a plug 46. Plug 46 is suitably mounted within the body in such a manner as to form a closure for the upper end of chamber 29. The lower end of pilot valve member 43 is enlarged to form a conical shaped valve surface 47, adapted to cooperate with a stationary valve seat 48.

To bias the pilot valve member 43 towards closed position, suitable means is provided such as a compression spring 49. The lower end of compression spring 49 seats upon an annular shoulder 51, formed on plug 49, while the upper end of the spring seats upon an annular shoulder formed on a cap 52. Cap 52 is in turn secured to the upper end of pilot valve member 43, as by means of a threaded connnection.

In order to cause downward deflection of diaphragm 34 to effect opening of the pilot valve member 43, positioned immediately below diaphragm 34, there is a spider 53, made of suitable material such as light metal, and having an upper convexly curved surface. Depending cylindrical shaped flange 54 is formed upon spider 53, and this flange is suitably guided within a bore 56 formed within plug 46. The lower side of spider 53 is provided with a cavity 57, to accommodate cap 52, and positioned within this cavity, between the upper end of cap 52 and the adjacent opposed surface of spider 53, there is a thrust transmitting disc 58. Disc 58 can be of hard metal or of a suitable relatively hard non-metallic composition. To retain disc 58 in proper position, its peripheral edge is shown engaged by a threaded ferrule 59, surrounding cap 52. Spider 53 is preferably held upwardly in contact with diaphragm 34 by means of a compression spring 61.

The space formed below diaphragm 34, within the body 10, and within which the main portion of spider 53 is disposed, forms a chamber 63, and it is gas within this chamber which exerts upward force upon diaphragm 34. Referring to Fig. 3, chamber 63 is in communication with a passage 64, through ducts or ports 66. Passage 64 is relatively unrestricted, and as shown in Fig. 1, it is formed of a tube 67, having its lower end terminating within the outflow opening 12, at a point adjacent the outflow side of passage 14, and preferably in a plane substantially parallel to the direction of flow of gas. Associated with the pilot valve member 43, there is also provided ducts or passages, which permit flow of gas from chamber 29 to the outflow opening 12, when this valve member is in open position. Thus valve member 43 is provided with a portion 68 of reduced diameter, which affords a gas passage 69 immediately above the valve surface 47. Gas passage 69 is in communication with radial passages 71, which in turn communicate with an annular passage 72. Annular passage 72 is in communication with a duct or passage 73, which in turn communicates with a space 74 formed within the valve body. Space 74 has free communication with the outflow opening 12.

The trapped gas within chamber 38 is for the purpose of creating a bias tending to urge diaphragm 34 downwardly. The gas pressure within this chamber determines the outflow pressure to which the device will regulate. To enable an adjustment of this trapped gas pressure, to adapt the device to different requirements, I provide means for introducing regulated quantities of gas from the inflow opening 12, or for exhausting trapped gas if it is desired to reduce the pressure. Thus mounted within dome 36, are the needle valves 76 and 77, which are in communication with chamber 38 through ducts 78 and 79. Opening of needle valve 77 permits gas from chamber 38 to be exhausted to the atmosphere through duct 81 (Fig. 1). Opening of needle valve 76 permits introduction of gas under pressure into chamber 36, through duct 82. Duct 82 communicates with chamber 29, through duct 83. An additional needle valve 84 can be employed to control flow of gas between ducts 83 and 82. A maximum pressure relief valve 86 has also been shown communicating with duct 82, to preclude introducing too high pressure into chamber 38. This maximum pressure relief valve can be of simple construction, being shown formed of a slidable valve member 87, cooperating with a stationary seat 88. Compression spring 89 serves to bias valve member 87 towards closed position, and the compression of this spring can be adjusted by screw 91. In the event it is attempted to introduce too high a pressure into chamber 38, relief valve 86 is moved to open position, to permit exhausting of gas through duct 92.

To explain the mode of operation of my device, and the method involved, it will be presumed that the inflow opening 11 is connected to a tank under relatively high pressure of say two thousand pounds per square inch. It will also be presumed that there is no demand upon the outflow side, that is, that piping connected to the outflow opening 12 is closed. By virtue of gas pressure from the inflow side within chamber 29, a differential force will be exerted upon piston 18 and valve member 16, to maintain the same in closed position. Likewise pilot valve member 43 will be maintained closed, by virtue of fluid pressure acting upon the lower end of the same. If the operator now wishes to set the device for an outflow pressure of say twenty pounds, needle valves 76 and 84 are opened, to permit introduction of gas into chamber 38 above diaphragm 34. By means of a pressure gauge connected to dome 36, an amount of gas is introduced into chamber 38 to bring the pressure within the same to twenty pounds per square inch. Needle valves 76 and 84 are then closed. The gas pressure in chamber 38 will unbalance the forces tending to urge diaphragm 34 upwardly and thus this diaphragm will be deflected downwardly to open the pilot valve member 43. Fluid pressure in chamber 29 is therefore permitted to flow with little restriction through passages 69, 71, 72, and 73 to the outflow side of the device and since flow of high pressure gas from the inflow opening 11 is restricted by virtue of ports 24 and 27, and because of expansion of gas in chamber 31, differential fluid pressure is created tending to lift piston 18 and valve member 15 to their uppermost positions. High pressure gas flowing through the passage 14 immediately builds up pressure in the piping connected to outflow opening 12, to slightly greater than twenty pounds, at which time this outflow pressure in chamber 63, exerted upon the under side of diaphragm 34, forces the diaphragm upwardly to permit closing of pilot valve 43. Immediately upon closing of this pilot valve, high pressure again builds up in chamber 29, to cause the main valve 16 to close.

If a relatively small demand is now placed upon the outflow side, the action is as follows:—When the pressure in the outflow side drops a small amount, the diaphragm 34 is deflected downwardly to open pilot valve member 43. Sudden release of pressure in chamber 29, causes the main valve member 16 to be moved upwardly. The rush of high pressure gas through passage 14, creates a pressure wave within outflow opening 12, which reacts upwardly through the column of gas in tube 67 and upon the under side of diaphragm 34. The intensity of this pressure wave is sufficient to immediately deflect diaphragm 34 upwardly, to immediately effect a closing of pilot valve member 43. Immediately thereafter pressure again builds up in chamber 29 to close valve member 16. Upward reaction from diaphragm 34, is immediately followed by a downward reaction, which again opens pilot valve 43, and which opening is again followed by opening of main valve 16. The downward reaction upon diaphragm 34, immediately following an upward reaction by virtue of the pressure wave created in the outflow opening 16, is believed largely caused by a rarifaction surge which necessarily follows a pressure wave traveling through opening 12. The net result is that pilot valve member 43 reciprocates or flutters at a relatively rapid rate, and the main valve member 16 likewise flutters at the same rate or frequency, but out of phase with the movements of the pilot valve member. The frequency and likewise the movements of valve member 16 are automatically adjusted to be of such values as to maintain the mean pressure at the point of supply at that desired, as set by the pressure within chamber 38. When the pressure differential across the reducing valve is relatively high, say from two thousand to twenty pounds, and the demand upon the outflow side is slight, the frequency of movement of the main valve member will be relatively high, and in one practical embodiment approximates one hundred complete cyclic movements per second. The effect produced by varying the rate of demand upon the outflow side or by varying the differential between the inflow and outflow sides, or both, will be explained in a subsequent part of this specification.

When my device is operating under the conditions outlined above, it can be likened to a mechanical oscillating system, which extracts its own energy from the gas pressure, and which is continued in dynamic action by a trigger effect. I have found that such a dynamic system is extremely sensitive to mean pressure variations upon the outflow side, resulting for example from variations in the demand, and is also sensitive to variations in the differential pressure between the inflow and outflow sides. This sensitivity is manifest as follows:—If the differential pressure between the inflow and outflow sides remains substantially constant, while the demand is gradually varied from one of slight value, to one of moderate value, the device automatically accommodates itself to maintain the pressure upon the outflow side substantially constant, by automatically increasing the amplitude of movement of valve member 16, while maintaining the frequency of such movements substantially constant. At this point it should be noted that with slight demand valve member 16 merely flutters for a portion of its permissible movement, and does not move throughout its entire permissible stroke. An increased amplitude of movement of valve member 16 permits an increased quantity of gas to flow through passage 14, to supply the increased demand. If the demand remains substantially constant, and of a moderate value, while the differential between the inflow and outflow increases, as for example, by increasing the pressure upon the inflow side, the device likewise automatically accommodates itself by increasing the frequency of movement of valve member 16, and by decreasing the amplitude of such movements. A third condition can be presumed, approximating normal operation, in which the demand upon the outflow side is increased from slight to moderate values, and in which the differential between the inflow and outflow simultaneously decreases. Under such conditions the device automatically accommodates itself by decreasing the frequency of movements of valve member 16, and simultaneously increasing the amplitude of such movements.

For maximum demand, corresponding to a direct discharge from opening 12 to the atmosphere, valve member 16 will remain in full open position and will not flutter. Under such conditions pilot valve member 43 likewise remains in full open position as the static pressure transmitted to the underside of diaphragm 34 through passage 64, is insufficient to overcome the fluid pressure of gas trapped in chamber 38. As the demand is gradually decreased from maximum value, valve member 16 will automatically start to reciprocate throughout its maximum permissible stroke, and the frequency of such reciprocating movements will increase as the demand is decreased. After the demand is decreased below a given value, the movements of valve member 16 become less than its permissible stroke, and from that point down to a point where the demand is slight, accommodation is both by varying frequency and varying amplitude.

In actual tests of my reducing valve, I have noted the recorded pressure upon a pressure gauge connected with the outflow side, while varying the differential pressure between the inflow and outflow sides between wide limits, and while varying the demand upon the outflow side from slight to moderate values. During such tests I have been unable to note any appreciable change in the mean pressure upon the outflow side. In connection with such tests, it is obvious that under maximum and near maximum demand conditions, the static pressure upon the outflow side will fall below the pressure desired, due to limitations of the source of gas under pressure. Such conditions are therefore abnormal, under which no regulator can be effective.

To make possible a mode of operation such as explained above, there should be a minimum of damping of movements of the main valve member 16 and of pilot valve member 43, and the valve member 16 together with its actuating means, and pilot valve member 43 in its associated actuating means, should be in a state of labile equilibrium with respect to resilient forces acting upon the same. In other words at no time should the fluid forces acting upon valve member 16 and piston 18, tend to hold the valve member in an intermediate balanced position for an appreciable period. Under normal conditions when both the pilot valve member and the main valve member 16 are continuously reciprocating, as under moderate or slight demands upon the outflow side, forces upon the same are continually changing in such a manner as to prevent conditions of equilibrium. Only a pilot valve and its actuating means, and a main valve with its actuating means, characterized by labile equilibrium, can be employed in my device, because rapid dynamic movements are employed, and because the action of pressure waves is utilized in actuating diaphragm 34. If tube 67 were connected to the outflow side at a remote point, rather than at a point adjacent passage 14, the device would cease to be an accurate regulator. Likewise if valve member 16 and its associated piston 18 were damped to a substantial degree, and were proportioned and adapted to effect stabile equilibrium with respect to fluid forces acting upon the same, the device would not operate in the manner desired, irrespective of the point of connection of tube 66.

It is evident that a change in the temperature of gas trapped in chamber 38 would have the effect of modifying the regulating action. Therefore if constant pressure regulation is desired the gas in this chamber should remain at a constant temperature, or means should be employed to insure constant pressure irrespective of temperature.

Because of rapid fluttering of the valve 16, it may be anticipated that the seat 13 might be subjected to undue pounding, thus resulting in reduced useful life. On the contrary, in actual practice I have found that the pounding is not severe, and that there appears to be an inherent cushioning action. However there is sufficient repeated contact between the valve working surfaces to cause the valve member to seat tightly when the demand ceases, and to prevent formation of ice, where the valve is operating on high pressures.

Without attempting further the explanation of the theory of operation it may be noted that the parabolic portion 32 depending from valve member 16, aids in effecting automatic control, particularly in making possible variations in the amplitude of movement of the valve member.

The method incorporated in the invention will be clear from the above description. Briefly it involves the steps of repeatedly increasing and decreasing the effective area of the orifice means, at such a rate that the pressure waves so created near the outflow side of the orifice means, are substantially integrated or damped out to form a mean pressure at the remote point of supply. It also involves the use of the pressure waves, so created, to control or govern the frequency and amplitude of the variations in the effective area of the orifice means.

I claim:

1. In a gas reducing valve, a body having an inflow opening adapted to be connected to a source of gas under pressure and an outflow opening adapted to be connected to a point of gas supply, variable orifice means communicating between the inflow and outflow openings, said means including a stationary valve seat and a reciprocable valve member cooperating with said seat, actuating means connected to said valve member, said actuating means extracting its power from gas pressure on the inflow side of the orifice means, said valve member and said actuating means being characterized by labile equilibrium with respect to fluid forces acting upon the same and being substantially undamped with respect to oscillatory movements comparable to a rate of about 100 complete cyclic movements per second, and control means responsive to gas pressure waves adjacent the outflow side of said orifice means and associated with said actuating means, said actuating means and said control means being so coordinated and adapted that for small demands upon the outflow side said valve member is caused to reciprocate rapidly for only a portion of its permissible amplitude of movement, and for an increase in demand accompanied by a decrease in differential pressure across the orifice means, said reciprocating movements are caused to decrease in frequency and increase in amplitude.

2. In a gas reducing valve, a body having an inflow opening adapted to be connected to a source of gas under pressure and an outflow opening adapted to be connected to a point of gas supply, variable orifice means communicating between the inflow and outflow openings, said means including a stationary valve seat and a reciprocable valve member co-operating with said seat, actuating means connected to said valve member, said actuating means extracting its power from gas pressure on the inflow side of the orifice means, said valve member and said actuating means being characterized by labile equilibrium with respect to fluid forces acting upon the same and being substantially undamped with respect to oscillatory movements comparable to a rate of about 100 complete cyclic movements per second, and control means responsive to gas pressure waves adjacent the outflow side of said orifice means and associated with said actuating means, said control means including a pilot valve adapted to control supply of gas to said actuating means, said actuating and control means being so co-ordinated and adapted that for small demands upon the outflow side said valve member is caused to reciprocate rapidly for only a portion of its permissible amplitude of movement, and for an increase in demand accompanied by decrease in differential pressure across the orifice means said reciprocating movements are caused to decrease in frequency and increase in amplitude.

3. In a gas reducing valve, a body having an inflow opening adapted to be connected to a source of gas under pressure and an outflow opening adapted to be connected to a point of gas supply, a variable orifice means communicating between the inflow and outflow openings, said means including a stationary valve seat and a reciprocable valve member cooperating with said seat, actuating means connected to said valve member, said actuating means extracting its power from gas pressure on the inflow side of the orifice means, said valve member and said actuating means being characterized by labile equilibrium with respect to fluid forces acting upon the same and being substantially undamped with respect to oscillatory movements comparable to a rate of about 100 complete cyclic movements per second, and control means responsive to gas pressure waves adjacent the outflow side of said orifice means and associated with said actuating means, said control means including a pilot valve adapted to control a flow of gas from said actuating means, a diaphragm connected to said pilot valve and biased in a direction to urge the pilot valve towards closed position, means forming a gas chamber on one side of said diaphragm, said gas chamber being in communication with the outflow opening through a gas column at a point adjacent the outflow side of said orifice means, said diaphragm and said pilot valve being so proportioned and adapted that the control means as a whole is normally characterized by labile equilibrium with respect to resilient forces acting upon the same and being substantially undamped with respect to oscillatory movements comparable to a rate of about 100 complete cyclic movements per second, said actuating means and said control means being so coordinated and adapted that repeated opening and closing movements of the pilot valve are accompanied by repeated opening and closing movements of said valve member at the same frequency but out of phase.

4. In a gas reducing valve, a body having an inflow opening adapted to be connected to a source of gas under pressure and also an outflow opening adapted to be connected to a point of gas supply, variable orifice means interposed between the inflow and outflow openings, said means including a stationary valve seat and a reciprocable main valve member, an actuating member connected to the main valve member for operating the same, said body being formed to afford gas chambers on opposite sides of said actuating member, a pilot valve adapted to control venting of one of said chambers, said one chamber having direct restricted communication with the inflow passage and also independent restricted communication with the other chamber, whereby opening of said control valve causes abrupt momentary movement of the actuating member to open said valve member, and means responsive to pressure waves from the outflow side of said orifice means for recurrently actuating the pilot valve in synchronism with recurrent reciprocation of the main valve member.

5. In a gas reducing valve, a body having an inflow opening adapted to be connected to a source of gas under pressure and also having an outflow opening adapted to be connected to a point of gas supply, a variable orifice means communicating between the inflow and outflow openings, said means including a stationary valve seat and a reciprocable valve member co-operating with said seat, actuating means connected to said valve member, said actuating means extracting its power from gas pressure on the inflow side of the orifice means, said valve member and said actuating means being characterized by labile equilibrium with respect to fluid forces acting upon the same and being substantially undamped with respect to oscillatory movement comparable to a rate of about 100 complete cyclic movements per second, and control means responsive to gas pressure waves adjacent the outflow side of said orifice means and associated with said actuating means, said control means including a pilot valve adapted to control a flow of gas from said actuating means, a diaphragm connected to said pilot valve, means forming gas chambers upon opposite sides of said diaphragm, one of said chambers containing trapped gas under pressure and constituting substantially the sole resilient means serving to urge the diaphragm in a direction to open the pilot valve, the other one of said chambers being in communication with the outflow opening through a gas column at a point adjacent the outflow side of said orifice means, said diaphragm and said pilot valve being so proportioned and adapted that the control means as a whole is normally characterized by the fact that substantially no damping is afforded for oscillatory movements comparable to a rate of about 100 complete cyclic movements per second, said actuating means and said control means being so coordinated and adapted that recurrent opening and closing movements of the pilot valve are accompanied by recurrent opening and closing movements of said valve member at the same frequency but out of phase.

MARVIN H. GROVE.